US012430910B2

(12) United States Patent
Norman et al.

(10) Patent No.: US 12,430,910 B2
(45) Date of Patent: Sep. 30, 2025

(54) SYSTEM AND METHOD FOR EXPEDITING PRODUCTION OF REPLACEMENT GASKETS

(71) Applicant: LGC US ASSET HOLDINGS, LLC, Houston, TX (US)

(72) Inventors: Dale Norman, Spring, TX (US); Andrew Davison, Alvin, TX (US)

(73) Assignee: LGC US ASSET HOLDINGS, LLC, Houston, TX (US)

( * ) Notice: Subject to any disclaimer, the term of this patent is extended or adjusted under 35 U.S.C. 154(b) by 98 days.

(21) Appl. No.: 17/170,791

(22) Filed: Feb. 8, 2021

(65) Prior Publication Data

US 2022/0026875 A1 Jan. 27, 2022

Related U.S. Application Data

(60) Provisional application No. 62/971,462, filed on Feb. 7, 2020.

(51) Int. Cl.
*G05B 19/4097* (2006.01)
*G06V 10/25* (2022.01)
*G06V 20/20* (2022.01)

(52) U.S. Cl.
CPC ......... *G06V 20/20* (2022.01); *G05B 19/4097* (2013.01); *G06V 10/25* (2022.01); *G05B 2219/35134* (2013.01)

(58) Field of Classification Search
CPC .................. G05B 19/4097; G05B 2219/35134
See application file for complete search history.

(56) References Cited

U.S. PATENT DOCUMENTS

2002/0033885 A1* 3/2002 Schuler .................. G01B 11/24 348/207.99
2008/0100616 A1* 5/2008 Yamazaki ............ G06V 20/647 345/420
2008/0205792 A1* 8/2008 Andersen .............. G06T 3/4015 382/299
2008/0280040 A1* 11/2008 Barrall ................... F16J 15/125 427/256
2011/0019902 A1* 1/2011 Niles ........................ H02G 1/02 382/141
2011/0110579 A1* 5/2011 Walford .................... G06T 7/55 382/154
2014/0151916 A1* 6/2014 Larson ............... F01M 11/0004 264/40.1

(Continued)

FOREIGN PATENT DOCUMENTS

JP 2002033994 * 1/2002

OTHER PUBLICATIONS

Charles Goulding, Gaskets and 3D Printing: Joining Two Different Items for the Perfect Function, Feb. 16, 2019, Fabbaloo, pp. 1-9 (Year: 2019).*

*Primary Examiner* — Santosh R Poudel
(74) *Attorney, Agent, or Firm* — Alexander B. Uber; Gray Reed

(57) ABSTRACT

A method for expediting manufacture of replacement gaskets. A specialized scale is used to allow for rapid, accurate measurement of a gasket, or flange rubbing, remote from the gasket manufacturer. These measurements may then be imported into design software by the manufacturer to facilitate the production of replacement gaskets.

20 Claims, 4 Drawing Sheets

(56) References Cited

U.S. PATENT DOCUMENTS

| | | | | |
|---|---|---|---|---|
| 2015/0110421 | A1* | 4/2015 | Wexler | G06V 10/245 |
| | | | | 382/286 |
| 2015/0249822 | A1* | 9/2015 | Falk | G01C 25/00 |
| | | | | 348/187 |
| 2016/0045276 | A1* | 2/2016 | Pfanner | A61B 90/94 |
| | | | | 235/385 |
| 2018/0165841 | A1* | 6/2018 | Tholath | G06T 3/60 |
| 2019/0286760 | A1* | 9/2019 | Suessmuth | G06T 17/00 |
| 2019/0304175 | A1* | 10/2019 | Maresch | G06T 1/0007 |

* cited by examiner

SYSTEM AND METHOD FOR EXPEDITING PRODUCTION OF REPLACEMENT GASKETS

BACKGROUND AND SUMMARY OF THE INVENTION

The process for reverse engineering a gasket typically comes about when a facility has a gasket connection that is not well documented. Typically, there is little to no documentation or drawings available for either the gasket or the flange. In such a process, gasket or flange information is provided to a gasket manufacturer in the form of, for instance, a new or used gasket, or a rubbing of charcoal on butcher paper of the flange face. This is hereafter referred to as the sample. Traditionally the sample is sent to a specialized engineering department to reverse engineer and design a replacement gasket. Once there, the sample geometry information must be entered into a computer-aided design (CAD) program. Once that is done, a 1-to-1 layout is printed and compared to the sample. Virtually always, there are differences between the printed layout and sample once they are laid on top of each other. Any deviations or errors are marked, the CAD drawing is updated, and the comparison happens again. It generally takes multiple iterations to capture all sample features correctly. The more complex the sample, the more iterations it may take.

With respect to entering sample geometry information into a CAD program, there are three conventional methods. The first is to take physical dimensions of all the features of the sample with measuring tools (like calipers) and translate those to the CAD program. Depending on the complexity of the gasket, this can take minutes or hours. The second method involves taking a photo of the gasket and bringing the image into CAD. One drawback to this method is that cameras inherently distort the 3D reality in the 2D image. Moreover, scaling and tracing the image in CAD is never accurate the first time, although it can facilitate the initial attempt at the drawing. This method is often combined with the first method of measuring features. The third and final conventional method is to bring the sample to an optical scanner at the manufacturing facility and scan the sample. The window of the scanner is typically 3' or 4' square. The sample is placed on the scanner, and a 1-to-1 scan is passed to engineers for processing to create the drawing. At times, the scan can be sent straight to manufacturing depending on sample size and geometry. All these methods require shipment of the sample to a gasket manufacturer for offsite reverse engineering and possibly an investment in specialized tools (such as the scanning machine) that costs tens of thousands of dollars.

In contrast, by this present disclosure, a new and improved method for reverse engineering undocumented gaskets is described. The new method improves on efficiency, costs, and turnaround time in designing and manufacturing the new gasket. Rather than requiring multiple iterations of the drawing, the method disclosed herein may generate an accurate drawing in only one attempt. It also eliminates the need to physically send the sample to the gasket supplier or manufacturer. These improvements are realized through use of specialized measuring tools deployed onsite and specially configured software that allow for consistency in quality and are easy to use.

As compared to conventional approaches, the method disclosed herein is fundamentally different. For a given facility in need of a replacement gasket, personnel onsite may utilize a camera to photograph the component for replacement on a specialized scale. Rather than provide the sample to the gasket manufacturer, only photographs are needed. These photographs are then imported into software that is specially configured to extrapolate from the image the precise dimensions and features of the photographed sample. The scale and measures of the sample are thereby received without distortion. With these undistorted measures, a CAD drawing can be easily produced and used for manufacturing. Moreover, this method can accommodate gaskets of any size using one or more photographs. Testing has also demonstrated first drawings produced by this method are exactly right approximately 100% of the time.

DETAILED DESCRIPTION OF EMBODIMENTS OF THE PRESENT DISCLOSURE

The present disclosure relates generally to methods for reverse engineering and fabricating a gasket.

In certain embodiments, a replacement gasket may be reverse engineered and manufactured from an existing gasket by the process of producing a photograph of the gasket (or flange rubbing) against a specialized scale, causing the photograph to be imported into modeling software, creating a design drawing based on the image data generated by the modeling software, and manufacturing a gasket from the design drawing.

For producing a photograph, conventionally known cameras may be used. In certain embodiments, cameras of at least 20 megapixels are preferred. The specialized scale may compromise a plurality of targets arranged on a planar surface. These targets may be ringed automatically detected (RAD) targets. Preferably, each target is substantially identical to the other targets. The planar surface may be, for example, a sheet of material (paper, cardboard, PVC, etc.). To improve reusability of the specialized scale, the surface may be corrugated plastic with vinyl RADs having a matte finish disposed and secured thereon. Alternatively, the planar surface may be any surface (such as the ground or a wall) that is disposed substantially perpendicularly relative a camera when taking photographs of a gasket placed against said surface. The targets may be printed directly onto the surface or printed separately and later applied to the surface. If printed separately, the targets may be taped, or otherwise secured, to the surface after printing. The plurality of targets may comprise sixteen (16) pairs of RAD targets. The particular arrangement of targets on the surface may vary. Each of the RAD targets is preferably arranged such that its orientation is substantially the same as the other RAD targets disposed on the surface. This improves consistency and reliability in measuring.

Figure 2:
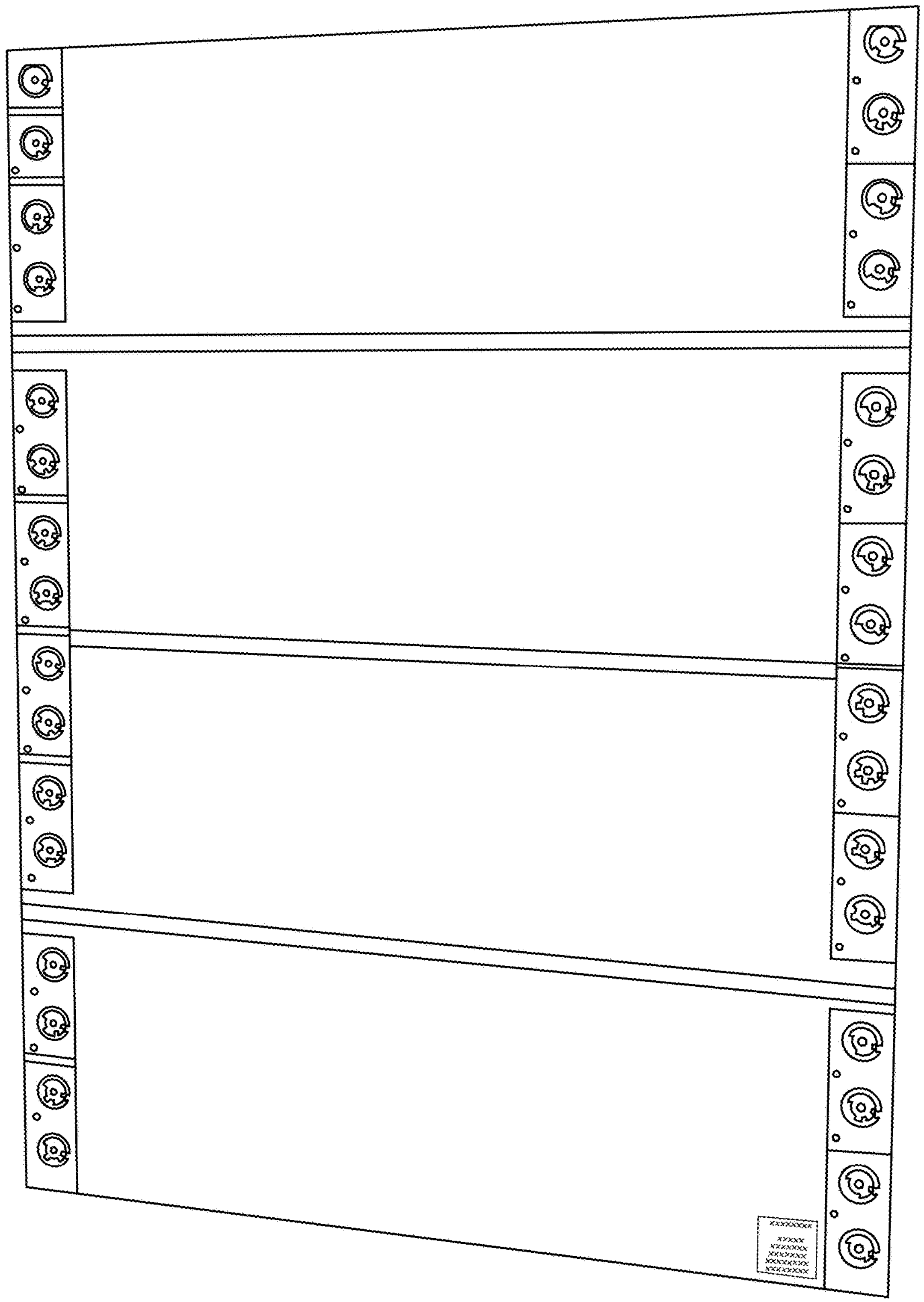
FIG. 2 depicts a specialized scale in accordance with embodiments of the present invention.
Figure 3:
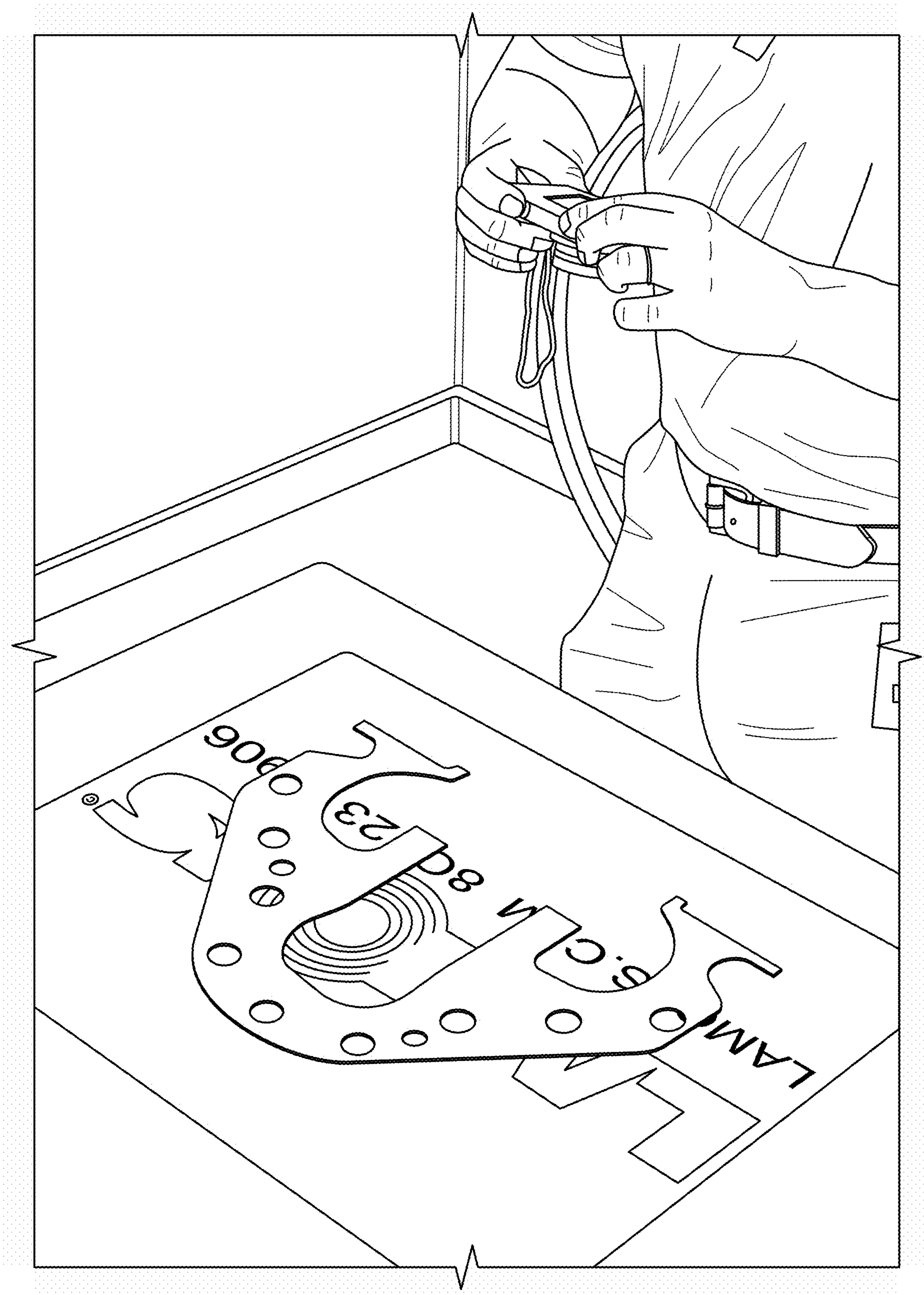
FIG. 3 depicts a gasket's arrangement on a specialized scale in accordance with embodiments of the present invention.

In one exemplary embodiment, as shown in FIG. 2, a first target of each of the sixteen (16) RAD-target pairs is disposed along a first edge of the surface, and a second target of each of the sixteen (16) RAD-target pairs is disposed along a second edge of the surface wherein the first edge runs parallel to the second edge.

Figure 4:
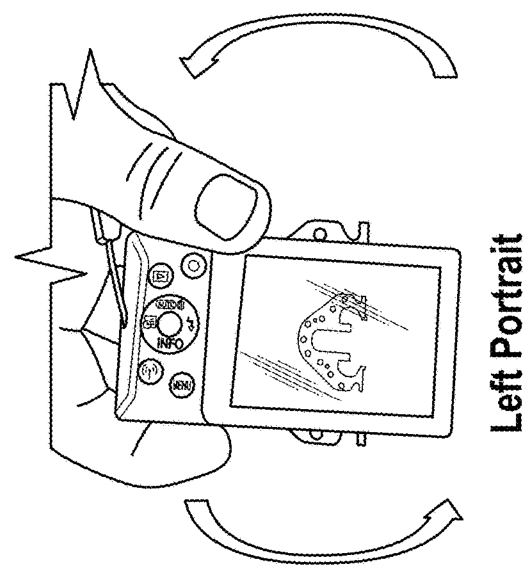
FIG. 4 depicts a set of configuration photographs in accordance with embodiments of the present invention.
Figure 4:
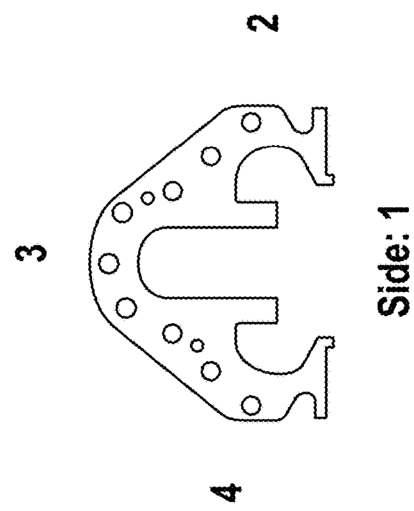
Figure 4:
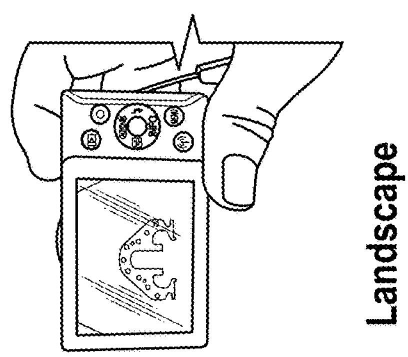
Figure 4:
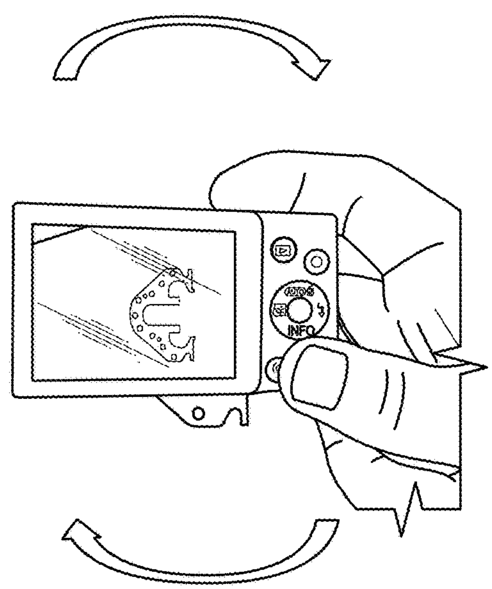

Prior to using the specialized scale, the modeling software may be specially configured thereby allowing it to capture measurement data from photographs of items taken against the specialized scale. The modeling software may be PhotoModeler. To perform the special configuration, per their coded target scale measurements guideline, several measurements are taken between specific RADs as disposed on the surface. Seen in FIG. 4, three (3) photographs from each of four (4) perpendicular directions of the RAD field are then taken resulting in twelve (12) configuration photographs. A test photograph may then be taken utilizing a sample item positioned on the surface with one or more targets of the plurality of targets visible in the test photograph. Preferably, at least ten (10) of the targets is visible in the test photograph. Within the PhotoModeler software, the Base Project set up may be run wherein the twelve (12) configuration photographs are input into the software along with the measurements taken. The configuration should then be tested by importing the test photograph. The software will automatically scale the image based on the measurements and configuration images previously processed. A resulting design file may then be generated which may be copied to other CAD software.

Clarity and quality of all photographs is essential to proper configuration and production of gasket photographs for use in the replacement process. Items placed against the specialized scale, as well as the specialized scale itself, should be free from foreign objects and in focus.

The same type of camera used to configure the software should be deployed onsite for capturing a photograph of gaskets for replacement. Moreover, a standardized specialized scale having targets (each substantially identical to the others) in a consistent, fixed arrangement should be similarly deployed. By using the same type of camera and standardized specialized scale, the configuration process above need only be completed once. The relevant RAD information and measurements imported into the modeling software will be used to generate design files for any items photographed by the camera against the specialized scale. If either the camera or specialized scale is modified, the software should be reconfigured.

Onsite in a facility, a field kit may be deployed that includes all materials needed to facilitate quick and easy reverse engineering of a gasket. The field kit may include a camera and specialized scale. As previously discussed, the camera and specialized scale should be those for which the modeling software has already been configured. A tape measure may also be included in the event that configuration photographs need to be taken onsite.

When a gasket needs to be replaced, personnel at a facility may take the gasket (or flange rubbing), place it on the specialized scale provided in the field kit, produce at least one photograph with the field kit camera, wherein the at least one photograph is taken substantially perpendicular to the specialized scale having the gasket (or flange rubbing) disposed thereon. Preferably, the specialized scale (in the form of a corrugated plastic sheet with vinyl, matte-finished RAD targets) will be placed on a flat base (floor, table, etc.). The gasket or flange rubbing may then be placed on top of the specialized scale. The entire scale should be visible in the photograph. The gasket or rubbing may extend beyond the edges of the specialized scale. In the event that the gasket or rubbing extends beyond the specialized scale's edges, additional photographs should be taken as needed to capture the entirety of said gasket or rubbing on the scale. As with the test photograph, within any photograph of a gasket of rubbing, at least ten (10) targets should be visible. The at least one photograph is preferably taken straight down toward, and substantially perpendicular to, the specialized scale.

Onsite personnel may then transmit the photograph via electronic mail (or other conventionally known methods of electronic communication) to a gasket manufacturer having the specially configured software. Engineers at the gasket manufacturer will then import the photograph into the modeling software which then generates the design files for use in CAD software. CAD drawings are then generated and used to manufacture a replacement gasket which can be delivered to the facility.

Figure 1:
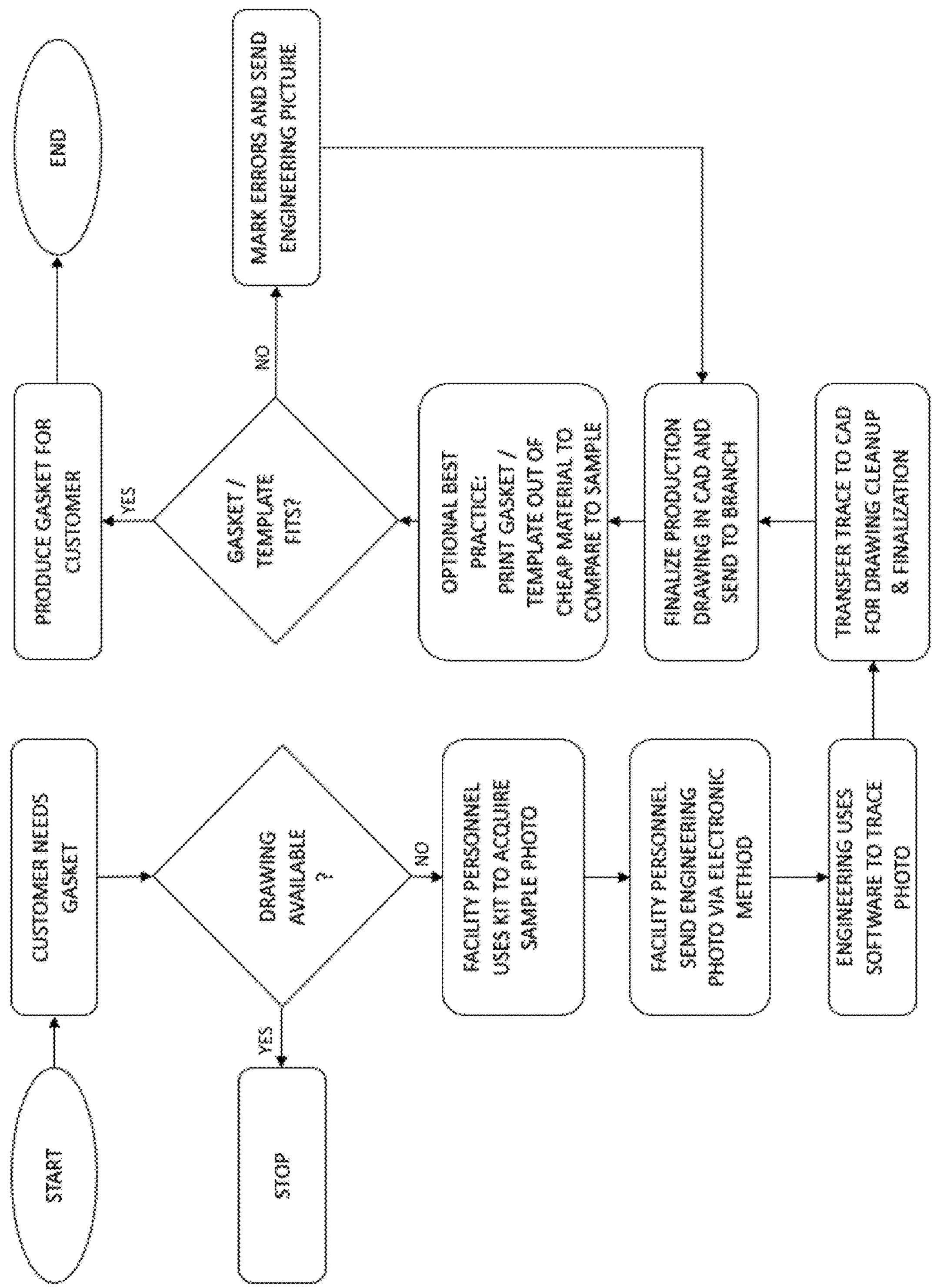
FIG. 1 is a flowchart depicting the general process of replacing a gasket in accordance with embodiments of the present invention.

Using the disclosed method, a drawing for a replacement gasket, for which there are no pre-existing drawings or design documentation, can be generated in approximately thirty (30) minutes or less. Not only does the disclosed method vastly reduce the time it takes to manufacture replacement gaskets, but it also obviates the need for a physical sample to be sent to a gasket manufacturer. Additionally, the drawings generated by this process can be easily stored for future use. A flowchart for creating a replacement gasket from the perspective of a gasket manufacturer is illustrated in FIG. 1.

Preferably, drawings in CAD software generated from the design files produced by the modeling software will be reviewed by engineers at the gasket manufacturer. A base template sample may be printed from a cheaper material and compared to the sample. Any errors or inconsistencies between the sample and drawing may then be marked and corrected to create a finalized drawing for use in manufacturing. After finalizing the drawing, facility personnel may then test fit a finalized template sample or otherwise confirm that the finalized template sample is satisfactory before manufacture of the production gasket.

Additionally, when using flange rubbings, any edges and holes are preferably made clear to ensure visibility of these elements in any photographs. Tracing of such elements may be needed.

In certain alternative embodiments, the specialized scale may comprise a plurality of targets configured to be disposed on top of a gasket or flange rubbing. These targets may similarly be composed of vinyl and have a matte finish. Rather than position the gasket or flange rubbing on the specialized scale, the specialized scale is positioned on top of the gasket or flange rubbing. The process is otherwise the same.

Although the disclosure has been described and illustrated with respect to exemplary objects thereof, it will be understood by those skilled in the art that various other changes, omissions, and additions may be made therein and thereto without departing from the scope of the present disclosure.

The invention claimed is:

1. A method for creating a replacement gasket comprising:

configuring a modeling software with a first camera a first portable scale, and geometric measurement data derived from said first portable scale, said first portable scale comprising a first planar surface having a plurality of markers disposed thereon;

receiving one or more photographs from one or more personnel, said one or more photographs of an object defining a gasket shape placed on a second portable scale substantially identical to said first portable scale, wherein said one or more photographs are taken with a second camera, wherein said second camera and said first camera are of the same type;

importing said one or more photographs into said modeling software, wherein said modeling software is configured to extract data representing said gasket shape from said one or more photographs;

generating a digital, two-dimensional drawing of a gasket from said data; and manufacturing a gasket from said digital, two-dimensional drawing.

2. The method of claim 1 wherein said digital camera is configured to generate photographs of at least 20 megapixels.

3. The method of claim 2 wherein said plurality of markers comprises at least one pair of markers, wherein for each pair of markers of said at least one pair of markers a first marker is arranged on a first edge of said planar surface and a second marker is arranged on a second edge of said planar surface, said first marker being positioned substantially opposite said second marker, said first edge positioned opposite and running parallel to said second edge.

4. The method of claim 2 wherein said plurality of markers comprises sixteen pairs of markers.

5. The method of claim 2 wherein said planar surface is composed of corrugated plastic.

6. The method of claim 5 wherein each marker of said plurality of markers is composed of vinyl and has a matte finish.

7. The method of claim 6 wherein said generating is performed by a computer-aided design (CAD) software.

8. A method for creating a replacement gasket comprising:

configuring a modeling software with a type of a digital camera a first portable scale, and geometric measurement data, said portable scale comprising a planar surface having a plurality of markers disposed thereon;

providing a field kit to one or more personnel, said field kit comprising said same type of said digital camera and a second portable scale substantially identical to said first portable scale;

receiving a photograph of an object defining a gasket shape placed on said second portable scale and taken with said digital camera from said personnel;

importing said photograph into said modeling software, wherein said modeling software is configured to scale said photograph based on said configuration and extract data representing said gasket shape from said photograph;

generating a digital, two-dimensional drawing of a gasket from said data; and manufacturing a gasket from said digital, two-dimensional drawing).

9. The method of claim 8 wherein an orientation of said plurality of markers disposed on said planar surface is substantially the same.

10. The method of claim 8 wherein said digital camera is configured to generate photographs of at least 20 megapixels.

11. The method of claim 8 wherein said plurality of markers each comprise a target pair, wherein a first target of each target pair is disposed along a first edge of said planar surface and wherein a second target of each target pair is disposed along a second edge of said planar surface.

12. The method of claim 8 wherein producing said photograph of said object is performed by taking at least one photograph substantially perpendicular to said planar surface.

13. The method of claim 8 wherein configuring said modeling software with said digital camera further comprises taking one or more configuration photographs of said portable scale from each of four perpendicular directions.

14. The method of claim 8 wherein configuring said modeling software with said digital camera further comprises taking a test photograph of a test object placed on said portable scale and causing said test photograph to be imported into said modeling software.

15. The method of claim 8 wherein said field kit further comprises a tape measure.

16. A field kit for creating a replacement gasket comprising:

a portable scale comprising a planar surface having a plurality of markers disposed thereon in a consistent, fixed arrangement;

a camera wherein said camera is digital, said camera is capable of capturing an image of an object defining a gasket shape in combination with said portable scale, said camera is of a type pre-configured in a modeling software to capture measurement data of an object defining a gasket shape;

wherein said modeling software is configured with geometric scaling data derived from a standard scale substantially identical to said portable scale, wherein said modeling software is further configured to import said image taken from said camera, scale said image based on said geometric scaling data, and extract said measurement data representing said gasket shape from said image; and wherein said field kit is portable.

17. The field kit of claim 16 further comprising a tape measure.

18. The field kit of claim 17 further comprising one or more additional separate printed targets for applying onto the surface of the object defining a gasket shape.

19. The field kit of claim 16 wherein said digital camera is configured to generate photographs of at least 20 megapixels.

20. The field kit of claim 19 wherein said plurality of markers comprises at least one pair of markers, wherein for each pair of markers of said at least one pair of markers a first marker is arranged on a first edge of said planar surface and a second marker is arranged on a second edge of said planar surface, said first marker being positioned substantially opposite said second marker, said first edge positioned opposite and running parallel to said second edge.

* * * * *